2,808,129
Patented Apr. 30, 1974

3,808,129
LOW FRICTION, HIGH LOAD BEARING
COMPOSITIONS
James Axel Lindlof, White Bear Lake, and George Morris Rambosek, Maplewood, Minn., assignors to Minnesota Mining and Manufacturing Company, St. Paul, Minn.
No Drawing. Filed Feb. 7, 1972, Ser. No. 224,242
Int. Cl. C10m 7/34
U.S. Cl. 252—12
5 Claims

ABSTRACT OF THE DISCLOSURE

A self-lubricating composition having high load bearing properties which comprises 100 parts by weight of a thermoset polymer having urethane or urea groups therein and having sufficient isocyanurate groups therein such that said polymer retains at least 60% of its room temperature hardness when measured at 350° F. after 1 hour and homogeneously dispersed therein, from 1 to 40 parts by weight of an inert organic lubricant which is a non-volatile fluid in at least part of the temperature range from 100° F. to the degradation temperature of said polymer.

---

This invention relates to new low friction compositions, their preparation and use. In one aspect this invention relates to novel lubricating plastic and to articles with self-lubricated, load bearing surfaces.

Historically, lubrication of moving parts or surfaces subject to wear has been accomplished with liquid lubricants. In many cases, the means of providing liquid lubricant on the desired surface has been quite complicated. In some machinery special oil passages have been used, seals have been required to prevent lubricant leakage, and pumps have been necessary to move the lubricant to the working parts of a machine. In spite of these difficulties and complexities, liquid lubrication has had certain advantages, including the low friction and high load carrying capacity of many liquid lubricant materials and the ability of the liquid lubricant to dissipate solid contaminants and wear products as well as corrosive materials and heat. Because the liquids are often recycled, they can be used to carry extreme pressure additives and other chemicals to the surfaces of the working machine parts and can be continuously filtered to remove abrasive particles.

Unfortunately, conventional liquid lubricants are not suitable for certain applications. For example, problems are encountered at extreme temperatures, high vacuum, extreme speed, extreme load, very low speed and in chemically or physically sensitive environments. Problems of this sort exist in the areas of food handling, photographic material processing and manufacture, coated paper manufacture, etc. For these and other reasons and further to provide a more simple lubricant system, solid lubricants have been developed in recent years. Self-lubricated parts, e.g., "oilite" bearings and low friction plastic, have been devised to solve lubrication problems at a lower cost, and, in the case of the plastic parts, with lower weight, lower noise level and reduced vibration. Many plastics inherently have relatively low friction surfaces and therefore can be usefully machined or molded to form plastic bearings, cams, gears and other parts. To improve their properties, various fillers have been introduced into the plastics. For example, the addition of polytetrafluoroethylene to various polymers such as polypropylene, polyethylene, polysulfone, acetyl, polycarbonate and various thermoplastic polyesters has been reported in Materials Engineering, pages 24–25 (August 1970) and in "TFE-Lubricated Thermoplastics," an article by John Y. Lomax and J. Tracey O'Rourke in the June 23, 1966 issue of Machine Design. Thermoset plastics for bearing applications are described in "Thermosetting Materials for Bearing Application," a brochure published by Fiberite Corp. of Winona, Minn. One known method for determining the efficiency of load-bearing material involves the determination of a "PV" limit for the material at various velocities. "PV" is the product of pressure in pounds per square inch "p.s.i." and velocity in feet per minute "f.p.m." the limit being defined as that point where failure occurs. The curve connecting points of limiting pressure and limited velocity on pressure-velocity coordinates defines the "PV" limits. The plastic or other composition sliding against another surface at a given temperature has a "PV" limit determined by the plastic surface reaching or exceeding its critical value. A discussion of "PV" values and plastic bearings is discussed in "Plastic Bearings," an article by D. D. Carswell in Machine Design (Mar. 10, 1966), pages 45–48.

Plastic articles having self-lubricating surfaces may be formed from compositions containing either thermoplastic or thermoset resins. Many permanent lubricant materials have been added to further improve the properties of plastics, such as graphite, molybdenum sulfide, oil, waxes, grease, etc. Included among the thermoset resins which have been employed are phenolics, epoxides, polyesters, urea formaldehydes and urethanes.

In spite of all the progress made in the field of self-lubricated plastics, new plastic formulations providing higher "PV" limits, low indices of friction and other desirable physical properties have been desired. One of the problems with conventional plastic formulations is the tendency of the coefficient of friction to increase excessively along with the PV limit.

It has now been found that a low friction, wear resistant plastic having high load bearing characteristics (i.e. high PV limit), high impact strength, and a low co-efficient of friction (e.g. below 0.25, normally below 0.12) is provided by a composition comprising thermoset polyisocyanurate polymer having sufficient isocyanurate groups therein such that said polymer retains at least 60% of its room temperature hardness when measured at 350° F. after 1 hour and, homogeneously dispersed therein as a discontinuous phase, from 1 to 40, preferably 5 to 30, parts by weight per 100 parts of said resin ("pphr.") particles of a chemically inert lubricant which is a nonvolatile fluid in at least part of the range from 100° F. to the degradation temperature of said polymer. The lubricant may be conveniently dispersed in the polymer forming system before the thermosetting reacion is initiated. To avoid segregation or settling of the lubricant particles, they can also be dispersed in the system just before the reaction has proceeded to the point of gelation.

The lubricant forming the discontinuous phase may be any of a wide variety of inert lubricating materials which exist in fluid form at some point within the operating temperatures of the composition (preferably 140° F.–200° F.), and their selection is made on this basis. Thus, if the composition is used under heavy load conditions, where the higher temperatures are generated, the lubricant is preferably one which becomes fluid without volatilizing at high temperatures and has a higher viscosity at those higher temperatures. For lighter duty load conditions, the lubricant is preferably one which becomes fluid at the lower temperatures reached in such service. If the lubricant is normally liquid at the temperature used for forming the thermoset polymer, such as an oil in room temperature reactions, it may be more effectively dispersed through the thermosettable components prior to their cure if it is contained within microcapsules, as shown in U.S. Pat. No. 3,516,941, thereby preventing the liquid lubricant from coalescing or separating from the polymeric matrix during the thermosetting reaction. Illustrative non-aqueous materials include low melting thermoplastic polymers (such as polyethylene), petroleum based oils and greases, silicone oils, waxes (particularly the paraffin waxes and especialy those with an inherent coefficient of friction of from 0.08 to 0.12), higher polyether glycols (such as "Carbowax," a trademarked product of Union Carbide Co.). The viscosity index of the lubricant should be selected so as to minimize lubricant loss under the intended load conditions in use, and viscosity improvers or aids may be added for this purpose. The "solid" lubricants, i.e. those which do not become fluid and flowable even in the higher temperature ranges, such as graphite, molybdenum disulfide, polytetrafluoroethylene, and the like, are not useful as the lubricants of this invention and do not, when used alone, provide the desired combination of high PV limit and low coefficient of friction. However, such "solid" lubricants may be included as fillers in the liquid or liquefiable lubricants of this invention. In general, the dispersed lubricant particles should have a diameter below about one millimeter, although the actual optimum size will vary with the selection of lubricant and the particular use. Lubricants which are at least partially organic are most preferred.

Organic thermoset polyisocyanurate polymers have been reported in the literature. They may be prepared from organic polyisocyanates, including mixtures thereof with polyols or polyamines by trimerization of the polyisocyanates in the presence of a suitable catalyst, preferably a catalyst which will permit polymerization at room temperature. The organic polyisocyanate reactant materials are known in the prior art (e.g. see U.S. Pat. No. 3,054,755); they can be represented by the general formula $R(NCO)_n$, where "R" is aryl, alkyl, or cycloalkyl, and "$n$" is an integer of 2 to 5. Polyisocyanates can be polymerized or trimerized to form cross-linked polyisocyanurates, such polyisocyanates being trimerized per se or in admixture with a compound having at least two active hydrogen atoms, e.g. a polyol or a polyamine. Representative polyisocyanates which can be used are aromatic polyisocyanates such as tolylene diisocyanate, diphenylmethane diisocyanate and xylylene diisocyanate. Tolylene diisocyanate, especially mixtures of the 2,4- and 2,6-isomers thereof, such as a mixture of 20 wt. percent of the 2,4-isomer and 80 wt. percent of the 2,6-isomer, is particularly preferred in that it is readily reactive with the preferred polyols, and is economically available commercially. Other suitable diisocyanates include m- or p-phenylene diisocyanate; 1,5 - naphthalene diisocyanate; 4,4' - diphenylmethane diisocyanate; hexamethylene diisocyanate; and 3,3' - dimethyl - 4,4' - biphenylene diisocyanate. Other useful polyisocyanates include polyisocyanate compositions obtained by phosgenating the polyamides prepared by condensing formaldehyde with aromatic amines. A list of useful commercially available polyisocyanates is found in "Encyclopedia of Chemical Technology," Kirk-Othmer, 2nd ed., vol. 12, pp. 46–47, Interscience Pub., N.Y. (1967).

NCO-capped urethane prepolymers can also be trimerized to produce poly(urethane-isocyanates) (i.e. urethane-modified polyisocyanurates). Such prepolymers can also be used in admixture with polyols and the mixture catalyzed to produce products with both urethane and isocyanurate linkages. When such prepolymers are used in admixture with primary or secondary polyamines, the products contain both urea and isocyanurate linkages. Such NCO-capper prepolymers are well-known (see U.S. Pats. Nos. 3,073,802 and 3,054,755) and are generally prepared by reacting an excess of polyisocyanates, such as an aromatic diisocyanate, with polyalkylene ether polyols or polyester polyols. The isocyanate can also be used in the form of a blocked isocyanate.

The polyol component of the polyisocyanate-polyol reaction mixture is preferably a low molecular weight polyalkylene ether polyol, but may also be a low molecular weight non-polymeric polyol, or a polyester or polyester amide containing reactive hydroxyl groups. The preferred polyols have a molecular weight between about 250 and 3000, more preferably 400 to 3000. Polyols having a molecular weight up to about 5000 are useful. Where a hard product is desired, the polyol preferably should have an average polyol or hydroxyl equivalent weight between about 130 and 400 (i.e. one active —OH group per 130 to 400 molecular weight of polymer). Where softer more rubbery cross-linked products are desired, the polyol may have one reactive —OH group per 400 to 1000 molecular weight of polymer. The rubbery products preferably should have a cross-link density of about 1 cross-link per 2000 to 20,000 atomic weight units, while the more preferred rigid products have a cross-link density of about 1 cross-link per 400 to 2000 atomic weight units.

Examples of the preferred polyether polyols are polypropylene ether polyols or polybutylene ether polyols. The preferred polyaklylene ether polyols are condensates of ethylene, propylene, or butylene oxide with pentaerythritol, sorbitol, sucrose, methylglucosides, or low molecular weight polyols, such as propylene glycol, tri-, tetra-, penta-, hexamethylene glycols, 1,3-butylene glycol, 1,3-(2 ethyl) hexane diol, 2,3,4 - trimethyl - 1,3 - pentanediol, trimethylol propane, 1,2,6-hexane triol, or phenyldiisopropanolamine. The low molecular weight polyols mentioned above can also be used, and preferably blended, with polymeric polyols as components in the reaction mixture.

Useful polyesters include castor oil, derivatives thereof, and those generally prepared by the esterification reaction of an organic dicarboxylic acid or anhydride with an alkylene oxide polyol. The preferred polyols are ethylene, propylene, and butylene oxide polyester polyols having two or more hydroxyl groups. The acid or anhydride may be selected from a wide variety of polybasic acids, such as malonic, succinic, glutaric, adipic, pimelic, sebacic, acids prepared by dimerization or trimerization of unsaturated eighteen carbon fatty acids, and others. The reactants are combined in molecular ratios to provide hydroxyl terminating groups on the polyester molecules. In the formation of these polyesters, it is quite common to provide mixtures of acids and anhydrides with mixtures of glycols and other polyols. The acid number may be controlled by methods known in the art, and is usually low, being under five.

Generally, the polyol-polyisocyanate reaction mixtures can have NCO/OH equivalent ratios in the range of 0.8/1 to 12/1, and even higher, e.g., 20/1 to 40/1; the preferred range is at least 1.2/1 since below the latter the product will contain unreacted or free hydroxyl groups (which have a plasticizing function) and will be a more flexible product. Poly(urethane-isocyanurate) products made from reaction mixtures having NCO/OH ratios of 0.8/1 to 1.2/1 can be characterized as isocyanurate-modified polyurethanes. Those poly(urethane-isocyanurate) products made from reaction mixtures with NCO/OH ratios of 1.2/1 and greater, e.g., 3/1 to 12/1, can be characterized as urethane-modified polyisocyanurates. The preferred products are those which are highly cross-linked by reason of having at least 20% of the available —NCO groups of the polyisocyanate reactant converted into isocyanurate linkages. For such, reaction conditions will be selected favoring trimerization of the available —NCO groups rather than for formation of urethane, urea, allophanate, or biuret linkages. In general, regardless of the NCO/OH ratio, the poly(urethane-isocyanurate or mixed polyisocyanurate-polyurethane) products of this invention have an amount of isocyanurate linkage in the polymer backbone sufficient to provide a heat stable product, i.e. a product which retains 60% to 100% of its room temperature hardness when heated at elevated temperature, e.g., 1 hour at 350° F.

Many catalysts are useful for the preparation of polyisocyanurate polymers, e.g. see "Poly-urethanes: Chemistry and Technology," part 1, by J. H. Saunders and K. C. Frisch, Interscience Pub., New York (1962), p. 94, and U.S. Pats. Nos. 2,965,614; 2,979,485; 2,993,870;

3,168,483; 3,179,626; 3,206,352; 3,211,704; 3,280,066; 3,381,008; 3,516,950 and 3,635,848; Belgian Pat. No. 753,203, granted Jan. 11, 1971; and U.S. patent application Ser. No. 185,410, now Pat. No. 3,736,298, filed Sept. 27, 1971. The amount of catalyst used in polymerizing the isocyanate or polyol-polyisocyanate reaction mixtures of this invention will vary, depending on the particular catalyst reactant used, and the desired activity of the catalyst. Generally, the amount of catalyst to use will be less than 10 wt. percent of the isocyanate. Functionally stated, the amount of catalyst to use will be that amount sufficient to catalyze the polymerization or trimerization of the reaction mixture at the desired temperature, which is preferably room temperature.

Where a higher cross-linked or chain-extended product is desired, the reaction mixture can include a conventional trifunctional isocyanate or a triol. The reaction mixture can also be modified by including monoisocyanates or alcohols such as 1,4-butane diol, butyl Cellosolve, butyl carbitol, oleyl alcohol, etc., to impart special properties to the polymer product, such as the degree of final hardness.

Along with the lubricants of this invention the polymer products can also be made by incorporating into the reaction mixture a minor amount of different powdered or finely divided reinforcing fillers (preferably in amounts from 0.1 to 25 weight percent of the mixture), such as clay, talc, rubbery granular aggregate, metal powder, titanium dioxide, diatomaceous earth, glass microbubbles or beads, reinforcing fibers (natural or synthetic), flakes (e.g. mica, metals) and the like. Co-reactant materials such as the diamines described in U.S. Pat. No. 3,248,454 can be included in the polyol-polyisocyanate reaction mixture, e.g., to increase the viscosity of moldability thereof as well as to increase the hardness of the resulting product. Fire retardant fillers, such as polyvinyl chloride and antimony or phosphorus compounds, can also be incorporated into the reaction mixture. Conventional catalysts can be used as co-catalysts in conjunction with a metal double alkoxide catalyst or a borate ester catalyst, particularly in making room-temperature curable polyurethanes. Such conventional catalysts include polyol soluble organic compounds of certain polyvalent metals, e.g., tin, lead, or mercury (see British Pat. No. 1,053,383). Generally, the amount of cocatalyst will be less than 10 wt. percent of the total weight of the mixture, and usually less than 5 wt. percent. Examples of such co-catalysts are phenylmercuric acetate, phenylmercuric oleate, mercuric octoate, mercuric naphthenate, lead octoate, lead naphthenate, dibutyl tin dilaurate, dibutyl tin diacetate, and similar compounds.

Friction tests were conducted on a modified Du Hadaway DH 100 Friction and Wear Tester, sold by Du Hadaway Tool and Die Shop, Inc., Wilmington, Del. Such equipment operates on a thrust washer principle, as described in "Wear of Plastics—Evaluation for Engineering Application," by Robert B. Lewis, Paper No. 63–WA–325, published Sept. 1, 1964 by the American Society of Mechanical Engineers. The DH 100 was modified by replacing the standard friction wheel with one 6 inches in outer diameter. The wearing surface of the steel wheel is $\frac{1}{8}$" wide. Two small samples (1" x 1½" x ½") are mounted in a holder which keeps them 6 inches apart. A thermocouple is inserted in a ¼" deep #60 drill hole drilled adjacent to the rotating friction wheel. Three load levels (16, 31, and 46 lbs.) are run at each of three speed levels (425, 1070, 2080 r.p.m.) corresponding to PV values from 42,720 to 602,000. Samples are tested at each PV level for 10 minutes, beginning at the lowest PV and working up. The temperatures and drag, measured with a scale attached to the sample holder, are recorded at the beginning and end of each 10 minute period. Ten minutes is long enough to reach a steady value. Testing is continued until either the top PV is completed, or until there is sufficient friction (>64 ounces of drag) to shut off the test apparatus. The coefficient of friction is calculated from the measured drag at the end of the 10 minute period. To determine the conditions of satisfactory performance or a PV limit, the PV values are plotted against the coefficient of friction for several velocities, thus providing a family of PV vs. coefficient of friction curves. A plot of the lowest friction values in each curve and a plot of the highest friction values in each curve bounds an area from the initial PV value of 42,720 up into PV values of several hundred thousand, where the material fails. The sample surface temperatures are recorded along the upper and lower plots, and the PV limit is arbitrarily set at 150° F. surface temperature as interpolated on these plots. Any PV value bounded by the two plots and the 150° F. line was stable, holding a constant coefficient of friction and temperature. When temperatures were above 150° F., the frictional performance drifted with an unstable or increasing temperature, which eventually resulted in material failure. The PV limit and coefficient of friction values subsequently reported are values at the mid-point of the 150° F. temperature line between the upper and the lower plots.

Wear tests were conducted on the modified Du Hadaway DH Friction and Wear Tester described previously. Samples were subjected to a PV value of 309,000 (1070 r.p.m. and 46 lbs.) until the drag was sufficient to shut off the machine, or for maximum of 30 minutes. The loss in sample weight was recorded and the wear factor (in grams/hour) was calculated from these data.

Impact data was obtained in the following manner. A 1" x 1½" x ½" sample of bearing material is secured in the test fixture and an eight pound, 18" long pendulum is allowed to impact on the surface of the bearing material after an 18" free fall from the horizontal. The impact area is $\frac{1}{8}$ inch wide and ¼ inch long and falls across the upper edge of the sample. In general, a scar ranging in depth from 0.005 inch to 0.100 inch remains; however, brittle samples will fracture.

EXAMPLE 1

An isocyanate terminated prepolymer was made by reacting 155 parts of methylene bis(phenyl isocyanate) with a mixture of 23.75 parts of polypropylene ether glycol (200 molecular weight) and 26 parts of polypropylene ether glycol (2000 molecular weight). The resulting isocyanate capped prepolymer had a viscosity of 1840 cps. and an isocyanate number of 216.

To 154.0 parts of this prepolymer was added 17.2 parts polypropylene oxide triol (3000 molecular weight, "Thanol 3002," a trademarked product of Jefferson Chemical Co.) and 28.0 parts of spheroidal wax particles (petroleum derived paraffin wax melting at 141.6° F. by ASTM D87; "Shellwax 200," a trademarked product of Shell Chemical Co.) having a particle size in the range of 50–300 microns. The components were mixed thoroughly with a 3-blade mixer, and the mixture was degassed under 28 inches mercury vacuum.

A reaction catalyst was prepared by charging a flask, fitted with thermometer, stirrer and water trap, with 675 grams (4.5 mols) of triethylene glycol and 46.5 grams (0.75 mol) of powdered boric acid. The resulting admixture was heated to about 130° C. under vacuum until the evolution of water ceased. It was then cooled to about 60° C., and a total of 42 grams (0.75 mol) of potassium hydroxide was added in three equal portions. After the addition was complete the reaction mixture was heated to 130° C. under vacuum until the water by-product was removed and was then cooled. The tetraalkoxyborate ester [B(O—CH$_2$CH$_2$—O—CH$_2$CH$_2$—O—CH$_2$CH$_2$OH)$_4$]$^-$K$^+$ in excess triethylene glycol (1.5 mols) was an amber colored liquid with a K/B atom ratio of 1/1. Two grams of this catalyst were carefully stirred into the above reaction mixture to minimize air inclusion, and the catalyzed mixture was poured into molds and allowed to thicken and gel at room temperature for 45 minutes. An oven postcure was made at 125° F. for 45 minutes, then at 200° F. for one hour. The polyisocyanurate product, containing 14% wax, was removed from the mold for testing.

The lubricated plastic sample had a coefficient of friction of about 0.1, an impact of 3.5 inch pounds/inch Izod, and a PV limit of about 200,000 to a surface temperature of 150° F. as measured by a thermocouple in a well drilled to 1/32 inch from the tested surface. The sample was tested as a bearing for 100 hours of continuous service, stabilizing at a constant temperature and a 107,000 PV value (V=1680 ft./min., P=64 p.s.i.) with insignificant measured wear.

EXAMPLE 2

In the same manner as in Example 1, an isocyanate capped prepolymer having a viscosity of 450–950 cps. and an isocyanate number of 171–175 was prepared by reacting 67 parts of toluene diisocyanate with 17.3 parts of polypropylene ether glycol (2000 molecular weight) and 16 parts of polypropylene ether glycol (200 molecular weight). To 154.8 parts of this prepolymer was added 17.2 parts of polypropylene oxide triol (molecular weight of 3000), 2.0 parts of the same catalyst as in Example 1, and varying amounts of the wax spheres of Example 1 to provide samples with 7%, 14% and 21% of the wax lubricant. The samples were cured as in Example 1.

A comparison of the 14% sample with the sample of Example 1 indicated that the coefficient of friction was about the same, the operating temperature limits and load bearing properties were about the same, and the impact was somewhat lower than the sample of Example 1. At wax loading levels below 14%, the resin matrix is stronger, but the coefficient of friction is higher. At wax loading levels above 21%, although the coefficient of friction is satisfactory, the resin matrix has lower impact resistance.

EXAMPLE 3

Samples were prepared with 7%, 14% and 21% of the wax spheres of Example 1, using the polyurethane matrix described in Example 1 of U.S. 3,546,148. In comparison to the sample of Example 1, the wear characteristics of the three samples were good, impact was good, but the friction values measured at about 107,000 PV were significantly higher. Bearings made from these samples were much less useful than those which contained a polyisocyanurate matrix, particularly at the higher load conditions.

EXAMPLE 4

The procedures and materials of Example 1 were used, except that the lubricant particles were prepared from a blend of 85% of the wax of Example 1 and 15% ethyleneacrylate copolymer ("Zetafax," a trademarked product of Dow Chemical Co.). From the resulting plastic, snowmobile slide rails, which are subjected to wear by the moving drive belt, were cast and machined to shape.

A snowmobile equipped with conventional plastic slide rails was operated in a field, running mostly over grass but occasionally over dirt areas. After three miles of operation the slide rails were virtually destroyed due to the heat of friction, and the top speed of the machine on snow was drastically reduced, almost to the point of inoperability. When the slide rails of this example were installed, the snowmobile operated reliably and without noticeable change for 75 miles over the same terrain. Upon inspection after the test, the slide rails showed only minimal wear.

EXAMPLE 5

Using the procedures and materials of Example 1, except for the lubricant, a variety of compounds were tested for their effect on load bearing and friction properties. The various additives, their loading level, and the results are shown in Table I. Those samples containing lubricants which did not flow under test conditions (i.e. graphite, "Teflon,"[1] and $MoS_2$) were significantly inferior to the sample containing a fluid forming lubricant (paraffin wax).

TABLE I

| Sample | Additive | Loading level, percent | Results |
|---|---|---|---|
| (a) | Paraffin wax | 14 | Up to 200,000 PV limit, good results. |
| (b) | Graphite | 5 | Excessive friction. |
| (c) | do | 20 | Do. |
| (d) | "Teflon"[1] | 5 | Sample failed. |
| (e) | do[1] | 20 | Do. |
| (f) | $MoS_2$ | 5 | Do. |
| (g) | $MoS_2$ | 20 | Sample failed at higher load and velocity. |
| (h) | Paraffin wax spheres of Ex. 1. | 21 | 150,000 PV limit, low friction. |
| (i) | Paraffin wax | [2] 21 | Improved impact, but somewhat higher friction than Sample (h). |
| (j) | do | [3] 21 | Do. |

[1] "Teflon" is a trademarked product of E. I. duPont de Nemours and Co., polytetrafluoroethylene.
[2] 2% glass fibers.
[3] 5% asbestos fibers.

EXAMPLE 6

Table II presents comparative coefficients of friction and PV limits for various plastic formulations with different types of lubricant additives. It will be noted from Table II that the unmodified polyisocyanurate samples are more brittle and subject to fracture in the impact test, but such samples are useful in applications where high impact resistance is not essential, e.g. sleeve bearings.

[1] "Teflon" is a trademarked product of E. I. du Pont de Nemours and Co., polytetrafluoroethylene.

TABLE II

| Resin | Lubricant | Lubricant level, percent | Coefficient of friction | PV limit | Impact (×10⁻³ inch) | Wear factor (gm./hr.) |
|---|---|---|---|---|---|---|
| Ex. 1 resin | Paraffin spheres of Ex. 1 | 14 | 0.1 | 200,000 | 10 | 0.15 |
| "Teflon"[1] | None | | 0.25 | 75,000 | 48 | >1.0 |
| Filled "Teflon"[1] ("Rulon A")[2] | "Teflon"[1] particles | | 0.26 | 100,000 | ([4]) | >1.0 |
| Ex. 1 resin | Wax spheres of Ex. 4 | 50 | 0.11 | 150,000 | 50 | |
| Do | Paraffin spheres of Ex. 1 | 21 | 0.125 | 150,000 | 20 | 0.218 |
| Do | do | 7 | 0.13 | 120,000 | 11 | 0.095 |
| Oilite bronze bearing | Oil impregnated | | 0.07 | 170,000 | 23 | |
| Ex. 1 resin | {Paraffin spheres of Ex. 1 / $MoS_2$} | 11 / 10 | 0.12 | 180,000 | 17 | 0.448 |
| Do | {Paraffin spheres of Ex. 1 / "Teflon"[1] particles} | 11 / 10 | 0.115 | 175,000 | 21 | 0.082 |
| Do | {Paraffin spheres of Ex. 1 / Graphite} | 11 / 10 | 0.11 | 190,000 | 18 | 0.290 |
| Do | Graphite | 20 | 0.26 | 80,000 | 23 | ([5]) |
| Do | {Paraffin spheres of Ex. 1 / Glass fiber} | 21 / 2 | 0.11 | 220,000 | 21 | 0.225 |
| Do | {Paraffin spheres of Ex. 1 / Asbestos fibers} | 21 / 2 | 0.14 | 230,000 | 28 | 0.172 |
| Polyisocyanurate[3] (unmodified) | None | | 0.30 | 85,000 | ([4]) | <0.044 |
| Do[3] | Paraffin spheres of Ex. 1 | 18 | 0.13 | 240,000 | ([4]) | 0.044 |

[1] "Teflon" is a trademark of E. I. duPont de Nemours and Co. for polytetrafluoroethylene.
[2] "Rulon A" is a trademark of the Dixon Co. for a filled polytetrafluoroethylene.
[3] Unmodified polyisocyanurate refers to the polymer obtained from procedure of Example 1 without the use of the polypropylene oxide triol.
[4] Fractures.
[5] Excessive drag.

EXAMPLE 7

The product of Example 1 was machined into a sleeve bearing (1 3/16 inch outside diameter) for a 3/8 inch steel shaft to replace the ball bearing unit on a 1/20 horsepower electric motor. After 4500 hours of continuous service at 1725 r.p.m., the sleeve bearing was removed and the internal dimension measured with a micrometer. No wear could be detected.

EXAMPLE 8

A lubricating polyisocyanurate material was prepared from 150 parts of the prepolymer of Example 1, 50 parts of the lubricant of Example 4, and 5 parts of the catalyst of Example 1. The materials were cured in a plunger die at 200° F. and 1 ton load and then were tested on the Du Hadaway friction tester. The low friction properties of the resulting material were verified by this test.

What is claimed is:

1. A self-lubricating composition having high load bearing properties which comprises 100 parts by weight of a thermoset polymer having urethane or urea groups therein having sufficient isocyanurate crosslinking groups therein such that said polymer retains at least 60% of its room temperature hardness when measured at 350° F. after 1 hour and as a discontinuous phase therein from 1 to 40 parts by weight of an inert lubricant which is a non-volatile fluid in at least part of the temperature range from 100° F. to the degradation temperature of said polymer.

2. The self-lubricating composition of claim 1 in which said inert lubricant is a non-volatile fluid at some point in the 140° F.–200° F. range.

3. The self-lubricating composition of claim 1 in which said inert lubricant is a paraffin wax having an inherent coefficient of friction from 0.08 to 0.12.

4. The self-lubricating composition of claim 1 fabricated in the shape of a bearing.

5. The composition of claim 1 in which said inert lubricant is present in an amount from 5 to 30 parts by weight.

References Cited

UNITED STATES PATENTS

| | | | |
|---|---|---|---|
| 2,983,504 | 5/1961 | Reuter et al. | 252—12 |
| 3,171,699 | 3/1965 | Maxey | 252—12 |
| 3,344,064 | 9/1967 | Brady et al. | 252—12 |
| 3,014,865 | 12/1961 | Seniff et al. | 252—12 |
| 3,224,967 | 12/1965 | Battista | 252—12 |
| 3,269,943 | 8/1966 | Armstrong et al. | 252—12 |

DANIEL E. WYMAN, Primary Examiner

I. VAUGHN, Assistant Examiner

UNITED STATES PATENT OFFICE
CERTIFICATE OF CORRECTION

Patent No. 3,808,129                    Dated April 30, 1974

Inventor(s) JAMES AXEL LINDLOF and GEORGE MORRIS RAMBOSEK

It is certified that error appears in the above-identified patent and that said Letters Patent are hereby corrected as shown below:

Column 3, line 65, "NCO-capper" should be
-- NCO-capped --.

Column 4, line 17, "polyaklylene" should be
-- polyalkylene --.

Column 4, lines 22-23, "1,3-(2 ethyl) hexane diol, 2,3,4-trimethyl-1,3-pentanediol," should be
-- 1,3-(2 ethyl) hexane diol, 2,2,4-trimethyl-1,3-pentanediol, --.

Column 6, line 23, "DH Friction" should be
-- DH 100 Friction --.

Column 8, Table I, Sample (f), "$MoS^2$" should be -- $MoS_2$ --.

Column 9, line 25, Claim 1, "inert lubricant" should be (per Examiner's Amendment)
-- inert organic lubricant --.

Signed and sealed this 17th day of September 1974.

(SEL)
Attest:

McCOY M. GIBSON JR.                    C. MARSHALL DANN
Attesting Officer                      Commissioner of Patents